(12) United States Patent
Bahl et al.

(10) Patent No.: US 6,883,004 B2
(45) Date of Patent: Apr. 19, 2005

(54) AUTOMATED INVOICE RECEIPT AND MANAGEMENT SYSTEM

(75) Inventors: Vincent Bahl, Durham, NH (US); Eric Campbell, Rye, NH (US)

(73) Assignee: Bottomline Technologies (de), Inc., Portsmouth, NH (US)

( * ) Notice: Subject to any disclaimer, the term of this patent is extended or adjusted under 35 U.S.C. 154(b) by 490 days.

(21) Appl. No.: 09/996,440

(22) Filed: Nov. 29, 2001

(65) Prior Publication Data

US 2002/0038305 A1 Mar. 28, 2002

Related U.S. Application Data

(63) Continuation-in-part of application No. 09/632,696, filed on Aug. 4, 2000.

(51) Int. Cl.[7] .............................................. G06F 17/30
(52) U.S. Cl. ............................ 707/10; 707/100; 705/40
(58) Field of Search ................................ 705/40; 707/9, 707/100

(56) References Cited

U.S. PATENT DOCUMENTS

| | | | | |
|---|---|---|---|---|
| 5,745,755 A | * | 4/1998 | Covey ........................ 707/203 |
| 6,058,380 A | * | 5/2000 | Anderson et al. ............. 705/40 |
| 6,317,745 B1 | * | 11/2001 | Thomas et al. ............. 707/100 |
| 6,360,211 B1 | * | 3/2002 | Anderson et al. ............. 705/40 |
| 6,609,114 B1 | * | 8/2003 | Gressel et al. ................ 705/50 |

* cited by examiner

Primary Examiner—Greta Robinson
Assistant Examiner—Sathyanarayan Pannala
(74) Attorney, Agent, or Firm—Timothy P. O'Hagan

(57) ABSTRACT

An automated invoice management system includes a network circuit for communicating invoice transactions with a plurality of client systems. The automated invoice management system receives an import invoice transaction compliant with a first client transaction definition from a first client system. The import invoice transaction identifies a second client system and amounts due from a second client system associated with the second client. The import invoice transaction is translated to a normalized invoice transaction and the normalized transaction is translated to an export invoice transaction compliant with a second client transaction definition.

13 Claims, 16 Drawing Sheets

Registered Client Table

| Column Name | Type and Maximum Length |
|---|---|
| Client Code (unique) | Char 8 (K) |
| Enterprise Name | Char 100 |
| Enterprise Address | Char 300 |
| Activation Date - Time | Timestamp |
| Activating User ID | Char 8 |

Figure 3a

Invoice Summary Table 62

| Column Name | Type and Maximum Length |
|---|---|
| Normalized Invoice Number | Auto-increment |
| Client Code of Vendor | Char 8 (K) |
| Client Code of Payor | Char 8 |
| Vendor Assigned Invoice Number | Char 50 (K) |
| Invoice Date | Date (K) |
| Vendor Assigned Customer Number | Char 50 |
| Payment Type Requested | Char 10 |
| Payment Transaction Code | Char 10 |
| Vendor Bank Code | Char 12 |
| Vendor Account Number | Char 35 |
| Services Gross Amount for Invoice | 999999999999.99 |
| Services Discount Amount for Invoice | 999999999999.99 |
| Services Net Amount for Invoice | 999999999999.99 |
| Goods Gross Amount for Invoice | 999999999999.99 |
| Goods Discount Amount for Invoice | 999999999999.99 |
| Goods Net Amount for Invoice | 999999999999.99 |
| Total Gross Amount for Invoice | 999999999999.99 |
| Total Discount Amount for Invoice | 999999999999.99 |
| Total Net Amount for Invoice | 999999999999.99 |
| Currrency | Char 3 |
| Text | Char 300 |

Figure 3b

Line Item Table

| Column Name | Type and Maximum Length |
| --- | --- |
| Normalized Line Item Number | Auto-increment |
| Client Code of Vendor | Char 8 (K) |
| Client Code of Payor | Char 8 |
| Vendor Assigned Invoice Number | Char 50 (K) |
| Invoice Date | Date (K) |
| Vendor Assigned Customer Number | Char 50 |
| Goods or Services | Char 1 ('G' or 'S') |
| Gross Item Amount | 999999999999.99 |
| Discount Item Amount | 999999999999.99 |
| Net Item Amount | 999999999999.99 |
| Item Description | Char 300 |
| Units | 999999999999.99 |
| Unit Price | 999999999999.99 |
| Unit Type | Char 20 |
| Percentage of Completion | 999999999999.99 |

Figure 3c

Remittance Summary Table

| Column Name | Type and Maximum Length |
|---|---|
| Normalized Remittance Transaction Number | Auto-increment |
| Client Code of Payor | Char 8 (K) |
| Payor Assigned Payment Number | Char 50 (K) |
| Payor Recognized Vendor ID | Char 50 |
| Client Code of Vendor | Char 8 |
| Payment Date | Date |
| Payment Type | Char 10 |
| Transaction Code | Char 10 |
| Vendor Bank Code | Char 12 |
| Vendor Account Number | Char 35 |
| Gross Payment Amount | 999999999999.99 |
| Total Discount | 999999999999.99 |
| Payment Amount | 999999999999.99 |
| Currency | Char 3 |
| Text | Char 300 |

Figure 3d

Remittance Detail Table 39

| Column Name | Type and Maximum Length |
| --- | --- |
| Normalized Invoice Transaction Number | Auto-increment |
| Client Code of Payor | Char 8 (K) |
| Payor Assigned Payment Number | Char 50 (K) |
| Payor Recognized Vendor ID | Char 50 |
| Client Code of Vendor | Char 8 |
| Vendor Assigned Invoice Number | Char 50 (K) |
| Inovoice Date | Date (K) |
| Gross Invoice Amount | 999999999999.99 |
| Total Discount | 999999999999.99 |
| Invoice Amount Paid | 999999999999.99 |

Figure 3e

Vendor Control Table 58a

| Column Name | Type and Maximum Length |
|---|---|
| Client Code of Payor | Char 8 (K) |
| Client Code of Vendor | Char 8 (K) |
| Payor Recognized Code for Vendor | Char 50 |
| Payor Recognized Vendor Name | Char 100 |
| Payor Recognized Vendor Address | Char 300 |

Figure 4a

Customer Control Table 58b

| Column Name | Type and Maximum Length |
|---|---|
| Client Code of Vendor | Char 8 (K) |
| Client Code of Vendor | Char 8 (K) |
| Vendor Recognized Customer ID of Payor | Char 50 |
| Vendor Recognized Customer Name | Char 100 |
| Vendor Recognized Customer Address | Char 300 |

Figure 4b

| Payor Client Menu | Vendor Client Menu |
|---|---|
| Extract File (invoice data) | Extract File (payment data) |
| View Invoice/Payment Data | View Invoice/Payment Data |
| Upload File Invoice | Upload File Payment |
| Manual Entry Payment | Manual Entry Invoice |

Figure 7a

{ 00345, 00000347, 00000077, 000~0543, 102301, ..., USD }
  186a  186b    186c    186d    186e    186n

{ <TNumber> 00345 <Vendor Code> 00000347 <Payor Code> 00000077 <Invoice Number> 000~0543
<Date> 102301 <Tag> ... <Currency> USD }

| Client Transaction Definition X 198 | Normalized Field ID 202 | Required? | Import Mapping Rules 200 |
|---|---|---|---|
| Segment ID | | | |
| Element | Field 1 | Yes | Truncate Left |
| Element | Field 7 | Yes | Truncate Right |
| Element | Field 9 | Yes | |
| . | . | | |
| . | . | | |
| Segment ID | | | |
| Element | Field 10 | Yes | 2 Most Significant Digits |
| Element | Field 10 | Yes | 2 Least Significant Digits |
| Element | Field 12 | Yes | |
| . | . | | |
| . | . | | |
| Segment ID | | | |
| . | . | | |
| . | . | | |

196 — Client Transaction Definition Z 198
196 — Client Transaction Definition Y 198
196 — Client Transaction Definition X 198

56

| Normalized Field ID 206 | Transaction Type X 208 | Export Mapping Rules 210 |
|---|---|---|
| Field 001 | Segment - Element | Add Leading Zeros |
| Field 002 | Segment - Element | Add Trailing Zeros |
| Field 003 | Unused | |
| Field 004 | Segment - Element | 2 Most Significant Digits |
| Field 005 | Segment - Element | 2 Least Significant Digits |
| . | . | . |
| . | . | . |
| . | . | . |

Figure 10b

AUTOMATED INVOICE RECEIPT AND MANAGEMENT SYSTEM

CROSS REFERENCE TO RELATED APPLICATIONS

The present application is a continuation in part of U.S. patent application Ser. No. Ser. No. 09/632,696 entitled Transaction Data Translation System filed on Aug. 4, 2000, the contents of such patent application is incorporated herein.

TECHNICAL FIELD

The present invention relates to a financial transaction system and method, and more particularly, to an improvement for a network-based system and method for automated invoice receipt and management.

BACKGROUND OF THE INVENTION

Typically a business will have an accounting software system that maintains a database of the business transactions with its customer, vendors, banks, and other third parties associated with the business as well as internal business transactions between internal accounts. The typical architecture of such accounting systems provides for data to be input into the system through predefined transactions. The system then updates applicable records in the data base.

For example, when an invoice is received from a vendor, an accounts payable employee will typically open a manual data entry (MDE) screen or panel which prompts the employee to enter each element of data from the invoice and then submit the entered data to the application as a single transaction. At that time the system will write the newly entered invoice into the database. To assure that all necessary transaction data is complete, the application will not accept the transaction and update the applicable records in the database until all required fields have been entered and the data is validated.

While these accounting systems facilitate record keeping and may reduce data entry for internal transactions, transactions between businesses have traditionally been handled by one businesses software system printing a document and the other business manually entering the transaction into their system using data from the document.

To facilitate the exchange of transaction documents electronically, in 1979 the American National Standards Institute (ANSI) charted the Accredited Standards Committee (ASC) to develop and maintain a standard for Electronic Data Interchange (EDI) of business transaction documents.

The ANSI ASC X12 "standards" are essentially a uniform syntax for packaging ASCII data items that comprise a business transaction. The syntax is simple, applying a lightly-structured set of labels and positional rules, and a looping structure, on ordinary ASCII characters. The key feature of an X12 standard transaction is that it is totally independent of the mechanical means of transmittal of information. The standards are for the interchange of data: information can be coded in X12 on one platform and application program, and transmitted—using floppy diskette, magnetic tape, or by any type of real-time or batch or packet telecommunication, or a combination of these methods—to any other platform and application program having an electronic X12 interpreter. The standards control simply the coding format used, rather than the transmission method.

ANSI ASC X12 syntax rules and code values are organized at four levels of transmission control standards, transaction set standards, segment directory and positional rules, and data element dictionary.

The transmission (or interchange) control standards provide for the overall electronic envelope in which one or more X12 transaction sets are carried from sender to receiver(s). The transmission control standards define such items as: how transaction sets are identified and how beginnings and endings of the transaction sets are defined, grouping of the transaction sets, identification of sender and receiver, and procedures for transmitting and for acknowledging receipt.

Each transaction set is roughly equivalent to a generic "type" of business paper document, such as an Invoice, or a Purchase Order, or a Report of Test Results. A three-digit number, called a standard-development track number, is used to identify each type of electronic document. As an example, a purchase order has a standard-development track number of 850, the invoice is an 810, and a request for quotation is an 840.

Each type of transaction set, in turn, is made up of a series of "segments"—each roughly equivalent to a "line", "block", or "field" of related data on a paper form. A segment code name is used to identify a logical and pre-defined combination of related data elements. For example, a segment code "DTM" specifies that "date-and-time" usually has three related data elements. The first data element would contain a code number or character indicating the kind of date to follow, such as shipping date, invoice date, publication date, or other pre-specified date. The second data element would contain the date itself, using six digits, and the third data element would be the time of day. Special characters separate data elements within the segment and mark the termination of a segment and the beginning of the next segment.

Another example of a segment might be the "PER" segment that represents the name and telephone number of the "person to contact" which is coded in X12 as:

PER*1C* W. M. Smith*TE*6035551234*\ where "PER" is the identifier for the segment, and "1C" and "TE" are the reference codes for person name (W. M. Smith) and phone number (6035551234). "\" signifies end of segment.

The data element dictionary provides definitions for the individual elements of data which are assembled to compose each segment of information within the electronic transaction.

The data element dictionary defines the data elements that can be transmitted and provides a standard identifying code for each element. Data elements are the X12 "atoms", the basic building blocks of the record being transmitted. Additionally, the X12 dictionary contains tables of pre-defined code values for commonly encountered items of business data. An example of data elements often found together are the telephone number of a point of contact; the X12 reference code is "TE," which when encountered tells the receiver that the following data item (e.g. "603–555–1212") should be interpreted as a telephone number rather than a fax or pager number. The value "TE" is an example of a standard, predefined X12 code value, and the phone number itself is an example of a user-supplied value. The X12 standards provide a powerful combination of predictable positions—or data "pigeonholes"—in which to place or find both kinds of elements of data.

In practice, the originator of an electronic transaction uses the X12 standards to construct a transaction which could be easily interpreted by a recipient familiar with X12, or, more importantly, the recipient's data processing equipment. The originator system utilizes the data element dictionary to identify how each element in his message should be coded, to determine how each of those elements should be sequenced in the order established in the segment dictionary, how those segments should be placed in a segment sequence within a transaction document, and how the transaction set should be grouped within a single transmission.

Despite the ultimate goal of EDI to standardize transactions between businesses, there is no true single standard governing the format of a transaction, as a practical matter. Instead, there are multiple data dictionaries defining transaction formats, with multiple versions which proliferate the business world, both domestically and globally. In addition to the X12 document sets discussed above, other formats include UN/EDIFACT (United Nations rules for Electronic Data Interchange For Administration, Commerce and Transport), CEFACT (Centre for Facilitation of Procedures and Practices for Administration, Commerce and Transport), NACHA (National Automated Clearinghouse Association), and SWIFT (Society for Worldwide Interbank Financial Telecommunications). From year to year, each of these data dictionaries is updated and a new version is issued. The update includes the addition of new "codes", or entries, to the data dictionary, the deletion of codes, as well as modifications of existing codes. For example, as of the year 1999, at least 13 different versions of X12 were in existence (version 2000 through version 4030). In a typical X12 version, over 63 data segments, 630 fields of information, and 10,000 codes exist for financial EDI. These statistics are compounded with each and every X12 version.

Therefore, from a practical standpoint, only large companies that exert substantial leverage over their trading partners can truly realize the efficiencies of EDI by using a single standard (e.g. their standard) while all of their trading partners conform to their standards.

If a company can not leverage its trading partners to us EDI in their standard, EDI is not likely to provide any cost savings as the multiple number of standards that would need to be maintained would likely cost more than data entry. For example, if a company without adequate leverage to provide for all of its suppliers to use a single EDI standard for sending invoices to the company, the company would have to maintain multiple dictionaries on its system and still be required to maintain a manual data entry department for those suppliers that do not use any form of EDI. Such costs would defeat any cost savings of receiving a portion of the invoices electronically.

What is needed is an invoice receipt and management system that can accept invoices from a plurality of suppliers using a plurality of electronic formats, manage and normalize the invoice data, and to provide the invoices to the customer in an electronic data structure that is compatible with the customers systems for electronic data entry.

SUMMARY OF THE INVENTION

A first aspect of the present invention is to provide an automated invoice management system for operation with a plurality of vendor client systems and at least one payer client system. The system comprises a network circuit for communicating invoice management data with the plurality of client systems. A session management engine is coupled to the network circuit and comprises means for establishing a secure session with at least a first vendor client system and with at least one payer client system through the network circuit. The session management engine further comprises means for receiving a first vendor invoice transaction compliant with a first vendor client transaction definition from the first vendor client system that includes identification of the payer client associated with the payer client system and amounts due from the payer client. A translation engine comprises means for translating the first vendor invoice transaction to a normalized invoice transaction and means for translating the normalized invoice transaction to an export invoice transaction compliant with a payer client transaction definition.

The system may further comprise a database and the session management engine may further comprise means for storing the normalized invoice transaction in the database.

A data mapping dictionary may associate an element in the normalized transaction to at least a portion of an element in the vendor first client transaction definition and at least a portion of an element in the payer client transaction definition. The data mapping dictionary may further include validation rules and the translation engine may further comprises means for validating the normalized transaction by determining whether each element in the normalized transaction complies with the validation rules.

The data mapping dictionary may further includes import mapping rules which comprise: a) rules that provide for associating at least one of the normalized element to a particular portion of an element in the vendor client transaction definition; b) rules that provide for truncating a portion of an element in the vendor client transaction definition to comply with transaction format rules of a corresponding normalized field; and c) rules that provide for adding default characters to an element in the vendor client transaction definition to comply with transaction format rules of a corresponding normalized field.

The data mapping dictionary may further include export mapping rules which comprise: a) rules that provide for associating at least one of the normalized elements to a particular portion of an element in the payer client transaction definition; b) rules that provide for truncating a portion of at least one of the normalized element to comply with transaction format rules of a corresponding element in the payer client transaction definition; and c) rules that provide for adding default characters to at least one of the normalized elements to comply with transaction format rules of a corresponding element in the payer client transaction definition.

The session management engine may further comprise: a) means for receiving a payer remittance transaction compliant with a payer client remittance transaction definition from the payer client system that includes remittance data associated with the export invoice transaction; b) means for translating the import remittance transaction to a normalized remittance transaction; and c) means for translating the normalized remittance transaction to an export remittance transaction compliant with a first client remittance transaction definition.

The translation engine may further comprise: a) means for translating a second vendor invoice transaction, that complies with a second vendor client transaction definition that is different than the first vendor client transaction definition and that identifies the payer client and amounts due from the payer client, to a second normalized invoice transaction; and b) means for translating the second normalized invoice transaction to a second export invoice transaction compliant with the payer transaction definition. In which case, the session management may further comprises a) means for receiving the second vendor invoice transaction from a second vendor client system; b) means for storing the second normalized invoice transaction in the database; and c) means for providing both the export invoice transaction and the second export invoice transaction to the payer client in a single file through the network circuit.

A second aspect of the present invention is to provide a method of providing automated invoice management services to a plurality of vendor client systems and at least one payer client system, the method comprising: a) establishing a secure session with at least a first vendor client system and with at least one payer client system through a network circuit; b) receiving a first vendor invoice transaction compliant with a first vendor client transaction definition from a first vendor system that includes identification of a payer client associated with the payer client system and amounts due from the payer; d) translating the first vendor invoice transaction to a normalized invoice transaction; e) storing the normalized invoice transaction in a database; and f) translating the normalized invoice transaction to an export invoice transaction compliant with a payer client transaction definition that is different than the vendor client transaction definition.

The method may further include validating the normalized transaction by determining whether each of a plurality of elements in the normalized transaction complies with validation rules.

The step of translating the vendor invoice transaction to a normalized invoice transaction comprises at least one of the following steps: a) associating an element in the normalized transaction to a particular portion of an element in the vendor client transaction definition; b) truncating a portion of an element in the vendor client transaction definition to comply with transaction format rules of a corresponding normalized element; and c) adding default characters to an element in the vendor client transaction definition to comply with transaction format rules of a corresponding normalized field.

The step of translating the normalized invoice transaction to an export invoice transaction compliant with a payer client transaction definition comprises at least one of the following steps: a) associating an element in the normalized transaction to a particular portion of an element in the payer client transaction definition; b) truncating a portion of an element in the normalized transaction to comply with transaction format rules of a corresponding element in the payer client transaction definition; and c) adding default characters to an element in the normalized transaction to comply with transaction format rules of a corresponding element in the payer client transaction definition.

The method may further comprise: a) receiving a payer remittance transaction compliant with a payer client remittance transaction definition from the payer client system that includes remittance data associated with the export invoice transaction; b) translating the payer remittance transaction to a normalized remittance transaction; and d) translating the normalized remittance transaction to an export remittance transaction compliant with a first client remittance transaction definition that is different than the payer client remittance transaction definition.

The method may further yet comprise: a) receiving a second vendor invoice transaction from a second vendor client system that complies with a second vendor client transaction definition that is different than the first vendor client transaction definition and that identifies the payer client and amounts due from the payer client; b) translating the second vendor invoice transaction to a second normalized invoice transaction; c) storing the second normalized invoice transaction in the database; d) translating the second normalized invoice transaction to a second export invoice transaction compliant with the payer transaction definition; and e) providing both the export invoice transaction and the second export invoice transaction to the payer client in a single file through the network circuit.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 3a is a table diagram representing column names in an exemplary invoice and remittance database table in accordance with one embodiment of the present invention;

FIG. 3b is a table diagram representing column names in an exemplary invoice and remittance database table in accordance with one embodiment of the present invention;

FIG. 3c is a table diagram representing column names in an exemplary invoice and remittance database table in accordance with one embodiment of the present invention;

FIG. 3d is a table diagram representing column names in an exemplary invoice and remittance database table in accordance with one embodiment of the present invention;

FIG. 3e is a table diagram representing column names in an exemplary invoice and remittance database table in accordance with one embodiment of the present invention;

FIG. 4a is a table diagram representing column names in an exemplary value set database table in accordance with one embodiment of the present invention;

FIG. 4a is a table diagram representing column names in an exemplary values set database table in accordance with one embodiment of the present invention;

FIG. 7a is a table diagram representing invoice and remittance transaction management menu choices in accordance with one embodiment of the present invention;

FIG. 9a represents an exemplary client transaction definition in accordance with one embodiment of the present invention;

FIG. 9b represents an exemplary client transaction definition in accordance with one embodiment of the present invention;

FIG. 10a is a table representing exemplary element mapping of an inbound transaction in accordance with one embodiment of the present invention; and FIG. 10b is a table representing exemplary element mapping of an outbound transaction in accordance with one embodiment of the present invention.

DETAILED DESCRIPTION OF THE INVENTION

Figure 1:
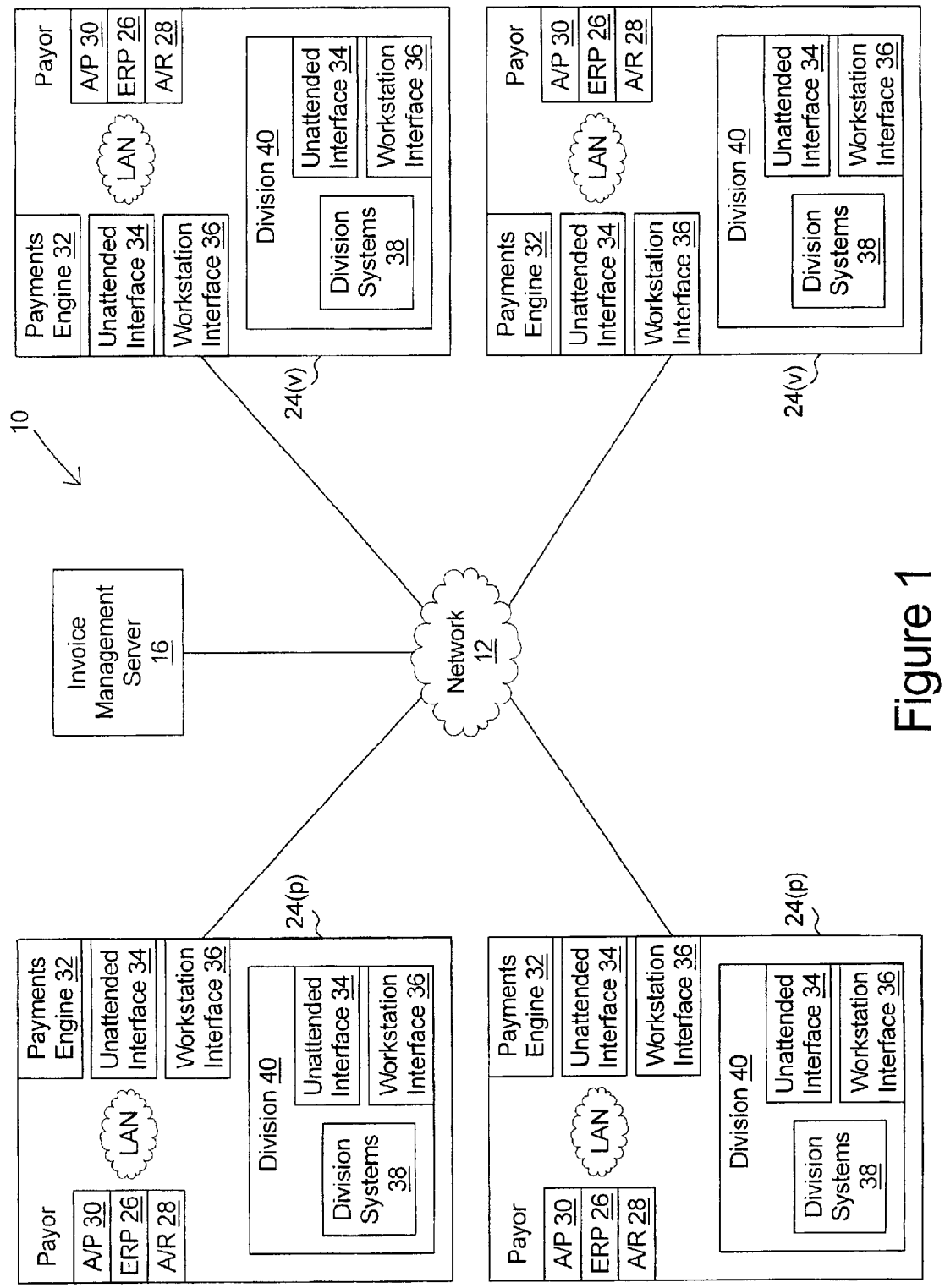
FIG. 1 is a block diagram of an automated invoice and remittance transaction management architecture in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

FIG. 1 illustrates exemplary architecture of an automated invoice receipt and management system 10 in accordance with one embodiment of the present invention. The architecture 10 comprises an automated invoice receipt and invoice and remittance management server 16 that is coupled to a community of client systems 24 by a network 12.

The client systems 24 comprise a plurality of payer client systems 24p and a plurality of vendor client systems 24v. Each client system 24 may include a proprietary database system 26 that may include an accounts payable system 30, an accounts receivables system 28, and other financial resource planning systems for recording and managing the client's invoice transactions with other clients 24. Each database system 26 may use different transaction definitions for electronically entering and extracting data (either through manual data entry screens or batch input/output files) and, each data base system 26 may use different value sets within elements of each transaction definition. For example, the database system 26 of one vendor 24v may identify a particular customer client 24p by a customer number "C-001" while another database system 26 of another vendor 24v may identify the same customer client 24p by a customer number "CXN57A".

Additionally, each client system 24 may have one or more division systems 40 that include a division resource management database 38 that utilizes different transaction definitions and different value sets than the client database system 26.

Each client system 24 and each of its division systems 40 may interface with the invoice management server 16 using at least one of the work station 28 and a an unattended interface module 34 that will establish a secure session with the invoice management server 16 over the network 12 for exchange of invoice transactions and remittance transactions.

The invoice management server 16 seamlessly manages the electronic exchange of invoice transactions and remittance transactions data amongst the client systems 24 (and the division systems 40) by independently communicating invoice data with each such client system 24 (or division system 40) using transaction definitions and value sets that are compatible with such client's (or division's) database system 26 or 38 respectively.

Figure 2:
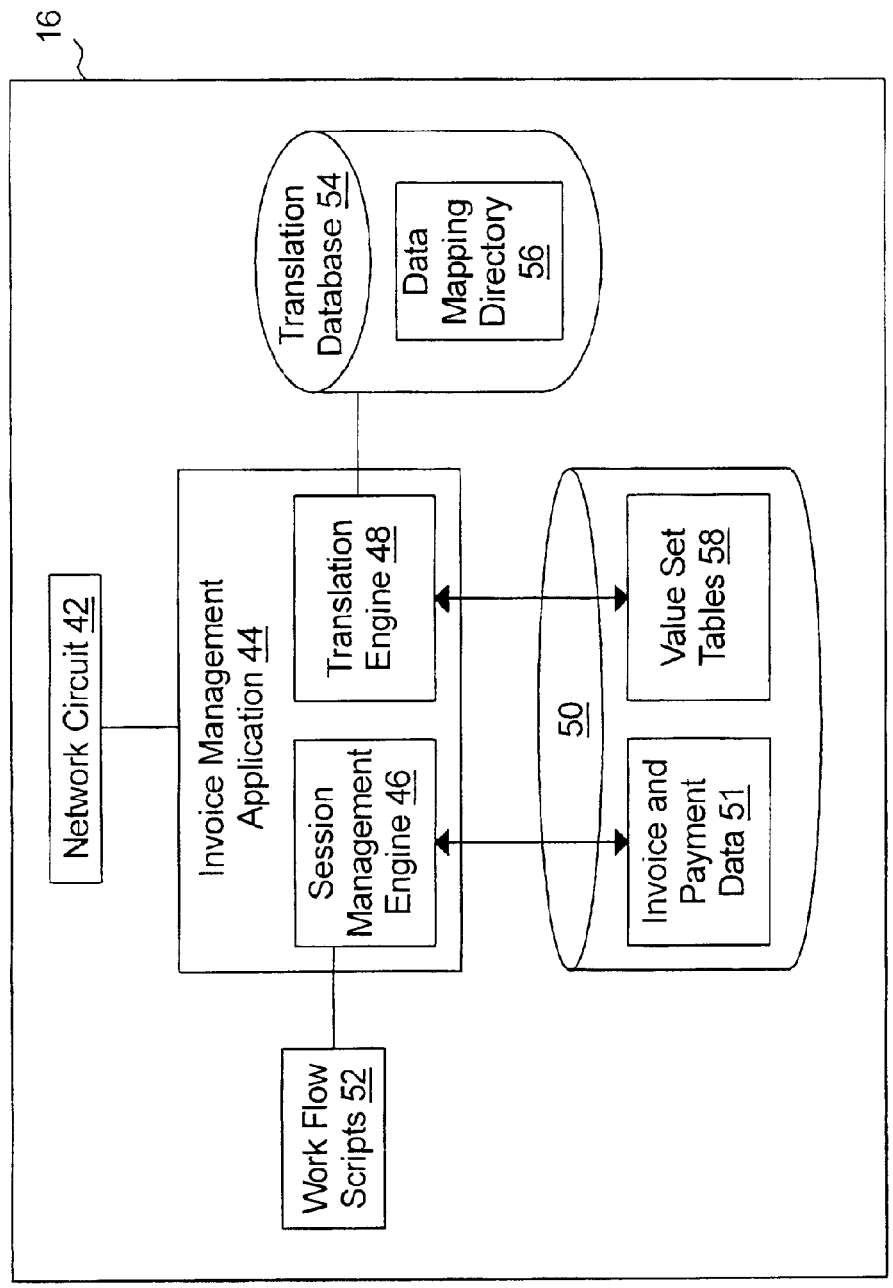
FIG. 2 is a block diagram of an automated invoice and remittance transaction management system in accordance with one embodiments of the present invention.

Turning to FIG. 2, exemplary structure of the server 16 is shown. The server 16 includes an invoice management application 44 that is coupled to a network circuit 42 and a database 50.

The network circuit 42 includes circuitry for interfacing between the invoice management application 44 and a network service providers communication medium for providing access to the network 12. In the exemplary embodiment, the circuitry may include appropriate routers, firewalls, and perimeter networks to provide for a secure interface and to prevent unauthorized access to the invoice management application 44 by other computing devices coupled to the network 12.

The database 50 may be a relational database and store invoice and payment data 51 in a table structure. Turning to FIGS. 3a–3e, exemplary table structures are shown. The registered client table of FIG. 3a associates a client's identification information such as the client's enterprise name and address with a unique normalized client code.

The invoice summary table of FIG. 3b, associates a unique normalized invoice transaction number to each invoice transaction managed by the invoice transaction server 16. Associated with the unique normalized invoice transaction number are a plurality of fields comprising the normalized client code of the vendor, the normalized client code of the payer, a vendor assigned invoice number, a vendor assigned customer number for the payer, and an invoice date.

Because the quantity of line items on an invoice is variable, line item information is stored in a line item table as represented by FIG. 3c. The line item table associates line item detail for each line item on an invoice to the particular invoice using the vendor assigned invoice number, the invoice date, and the normalized client code of the vendor, and the vendor assigned customer number of the payer.

The remittance summary table of FIG. 3d associates a unique normalized remittance transaction number to each remittance transaction managed by the invoice transaction server 16. Associated with the unique normalized remittance transaction number are a plurality of fields including the normalized client code of the payer, the normalized client code of the vendor, and a payer assigned payment number.

Because each remittance may apply to one or more vendor invoices (in whole or in part), each remittance payment can be considered to have a variable number of line items. As such, remittance line item information that includes identification of the paid invoices is stored in the remittance detail table represented by FIG. 3e.

The remittance detail table of FIG. 3e associates remittance detail such as the vendor assigned invoice number and the amount of the invoice paid to the payer assigned payment number and payment date.

Returning to FIG. 2, because each client may recognized other clients by customer numbers and vendor numbers that comprise different value sets than the normalized client ID numbers, the value set tables 58 associate value sets of each client transaction definition to normalized value sets. Turning to FIGS. 4a and 4b in conjunction with FIG. 2, the vendor control table 58a associates a payer recognized vendor ID code, vendor name, and vendor address to each vendor within the community that transact business with the payer. It should be appreciated that a single vendor identified by a normalized client ID number may be recognized to a payer as multiple vendors (such as different divisions or locations), each assigned a different payer recognized vendor ID code, vendor name, and vendor address. The vendor control table 58a accommodates such variations.

Similarly, the customer control table 58b, associates a vendor recognized customer ID code, customer name, and customer address to each payer client within the community that transacts business with the vendor client. Again it should be appreciated that a single payer identified by a normalized client ID number may be recognized to a vendor as multiple customers, each assigned a different vendor recognized customer ID code, customer name, and customer address. The customer control table 58b accommodates such variations.

Returning to FIG. 2, the invoice management application 44 includes applicable circuits for establishing and managing a secure session with each unattended interface 34 and each workstation 36 via the network circuit 42.

The invoice management application 44 further includes a session management engine 46 that controls the interface of invoice and remittance transaction files between the server 16 and the unattended interface module 30 or workstation 28 during the secure session in accordance with workflow scripts 52.

The invoice management application 44 further includes a translation engine 48 for interfacing invoice and remittance transactions between the invoice and remittance tables 51 of database 50 and each interface module 34 and workstation 36 using transaction definitions and value sets that are compatible with the client database system 26 (or division database system 38) for which such unattended interface module 34 or workstation 36 is operating.

Session Management Engine

The session management engine 46 operates a menu driven application for each of the unattended interface modules 34 and work stations 36 that have open communication sessions to the invoice management application 44.

During operation the session management engine 46 receives client instructions to perform various predetermined invoice and remittance transaction management operations and then performs processing steps in response thereto in accordance with work flow scripts 51.

Figure 5:
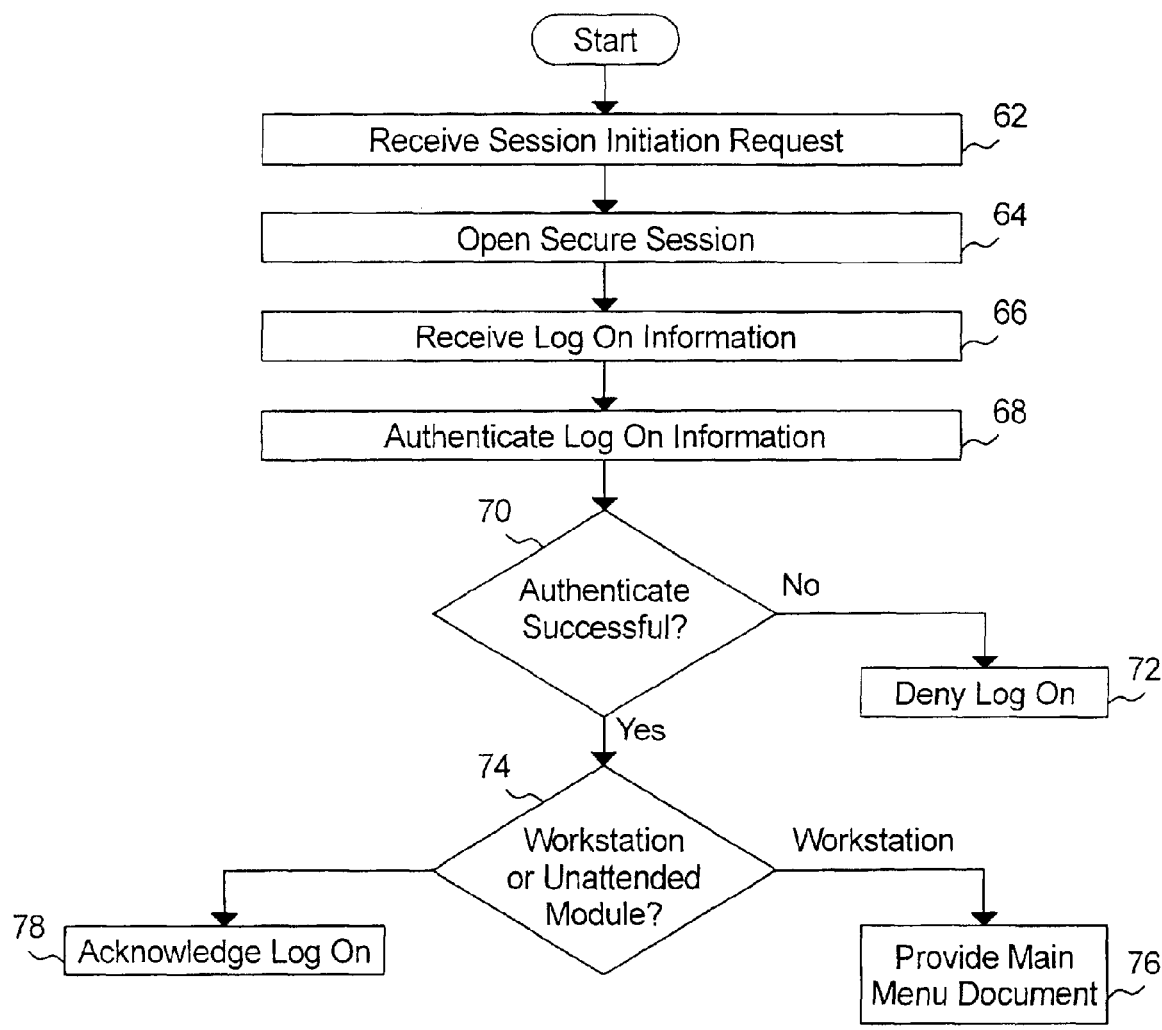
FIG. 5 is a flow chart representing an exemplary work flow script in accordance with one embodiment of the present invention.

Turning to the flowchart of FIG. 5 in conjunction with FIG. 2, exemplary steps performed by the session management engine 46 to logon each unattended interface module 34 or workstation 36 and to initiate invoice management following logon are shown.

Step 62 represents receipt of a session initiation request from the client (e.g. the workstation 36 or the unattended interface module 34). Step 64 represents opening a secure session with the client and step 66 represents receiving logon information from the client that may include a client ID number and password. At step 68 the logon information is authenticated by comparing it to a password database and, at step 70, if the logon information does not authenticate, access is denied at step 72.

In the exemplary embodiment, the password table will also include an identifier as to whether the client is a workstation 36 or an unattended interface module 34. As such, if the logon information does authenticate at step 70, then at step 74 the session management engine 46 may determine that the client is a workstation 36 and proceed to step 76 wherein a main menu document is provided to the workstation 36 or determine that the client is an unattended interface module 34 and proceed to step 78 wherein the logon is acknowledged to the unattended interface module 34.

Figure 6:
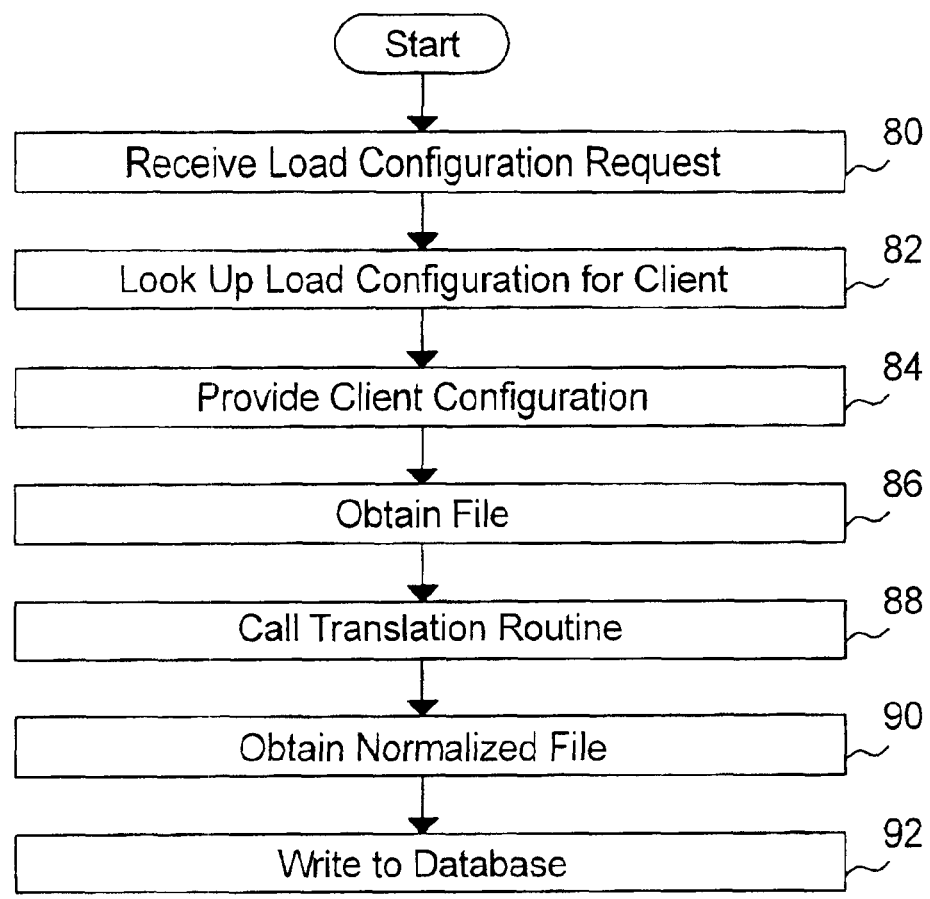
FIG. 6 is a flow chart representing an exemplary work flow script in accordance with one embodiment of the present invention.

After the unattended interface module 34 completes logon, the flow chart of FIG. 6a represents exemplary steps performed by the session management engine 46 for interacting with the unattended interface module 34. Referring to FIG. 6a in conjunction with FIG. 2, Step 80 represents receiving a request for a file loading configuration from the unattended interface module 34 and step 82 represents providing the file loading configuration data to the unattended interface module 34. Such configuration data may include a location on the client network to find a file for loading.

Step 86 represents obtaining the file. In the exemplary embodiment, the unattended interface module 34 will send the file through the secure session and write the file to a predetermined location. The session management engine 46 will then retrieve the file from such location.

Step 88 represents calling the translation routine of the translation engine 48 (discussed later herein) to convert the file from the client transaction definition and value set to the normalized transaction definition and value set.

Step 90 represents receiving the normalized transaction definition file from the translation engine 48 and step 92 represents loading the normalized transactions into the invoice and payment records 51 in the database 50.

After logon of a workstation 36 is complete the main menu document provided to the workstation 36 at step 76 of FIG. 5 may include menu choices for managing invoice and remittance transactions as a payer client or as a vendor client with exemplary menu choices for each represented by the table of FIG. 7. When managing invoice and remittance transactions as a payer, exemplary management operation may include extracting a file of incremental invoice transactions from the database 94, viewing invoice and/or payment data 96, uploading a file of payment transactions 98, and manual data entry of a payment 100.

When managing invoice and remittance transactions as a vendor, exemplary management operations may include extracting a file of incremental payment transactions from the data base 102, viewing invoice and/or payment data 104, uploading a file of invoice transactions 106, and manual data entry of an invoice 108.

Figure 7C:
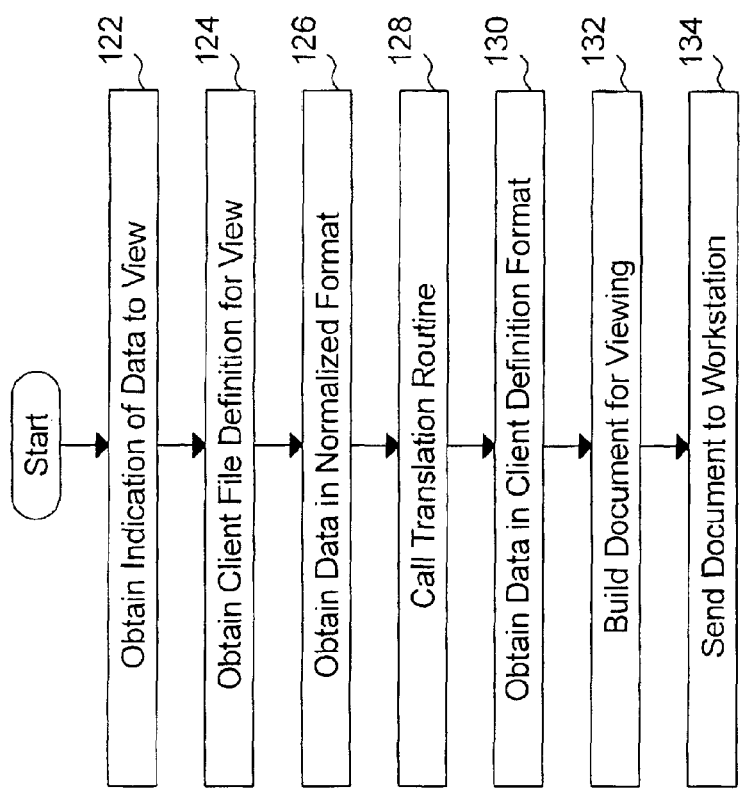
FIG. 7c is a flow chart representing an exemplary work flow script in accordance with one embodiment of the present invention.
Figure 7B:
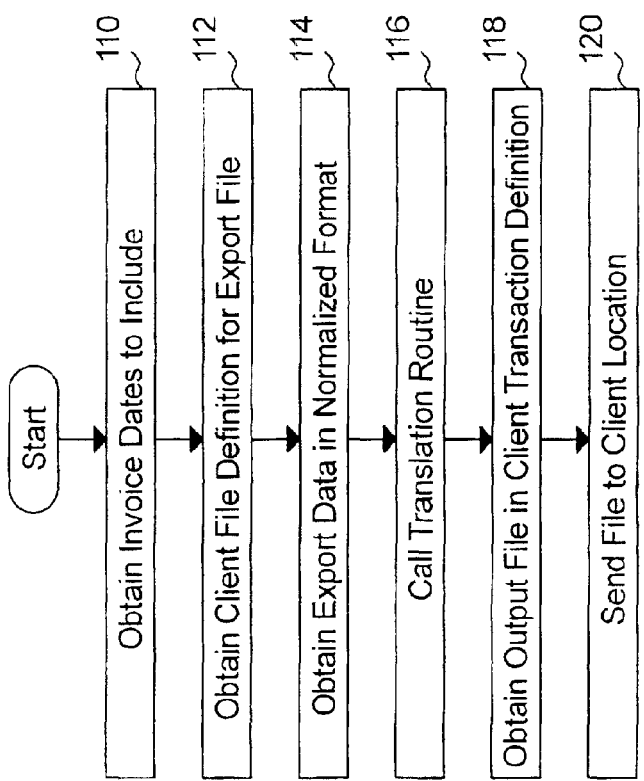
FIG. 7b is a flow chart representing an exemplary work flow script in accordance with one embodiment of the present invention.

Turning to the flowchart of FIG. 7b in conjunction with FIG. 2, exemplary steps for extracting a file of incremental invoice or remittance transactions (94 and 102 of FIG. 7a) are shown. Step 110 represents obtaining and indication of the incremental transactions to include in the extracted file. In the exemplary embodiment, the session management engine 46 provides a document to the workstation 36 to prompt the user of the workstation 36 to enter a start date and an end date such that the incremental transactions are those that fall between such dates. It should be appreciated that the extracted file may cover a time period in which, in the case of invoice transactions, will include invoice transactions from multiple vendors for the payer and in the case of remittance transactions may include multiple remittance transactions from multiple customers of the vendor.

Step 112 represents obtaining the client file definition for the export file. The session management engine 46 may obtain this by either looking up a transaction definition associated with the particular client 24 in an applicable database file or by providing a document to the workstation 36 to prompt the user of the workstation 36 to select from available client transaction definitions.

Step 114 represents obtaining the incremental transactions from the database 50 in the normalized format. Step 116 represents calling the translation routine of the translation engine 48 and step 118 represents receiving the transactions from the translation engine 48 that are compatible with the client transaction definition and with client value sets. Step 120 represents building a file of the incremental transactions and sending the file to the workstation 36 through the secure session.

The flowchart of FIG. 7c represents exemplary steps associated with viewing invoice/payment transactions (96 and 104 of FIG. 7a).

Step 122 represents obtaining an indication of the transactions that the user of the workstation 36 desires to view. This may include providing the workstation 36 with documents representing menus of choices for user selection and obtaining a post of the user selection through the secure session.

Step 124 represents obtaining the client transaction definition for the transactions to be viewed either through operator selection of available definitions or by looking up a client transaction definition that is associated with the client 24 in an applicable database file.

Step 126 represents obtaining normalized transaction data from the database that corresponds with the indication obtained at step 122. Step 128 represents calling the translation routine of the translation engine 48 and step 130 represents obtaining the transaction compatible with the client transaction definition and with client value sets from the transaction engine 48. Step 132 represents building a document to display the transactions and step 134 represents sending the document to the workstation 36 through the secure session.

Figure 7E:
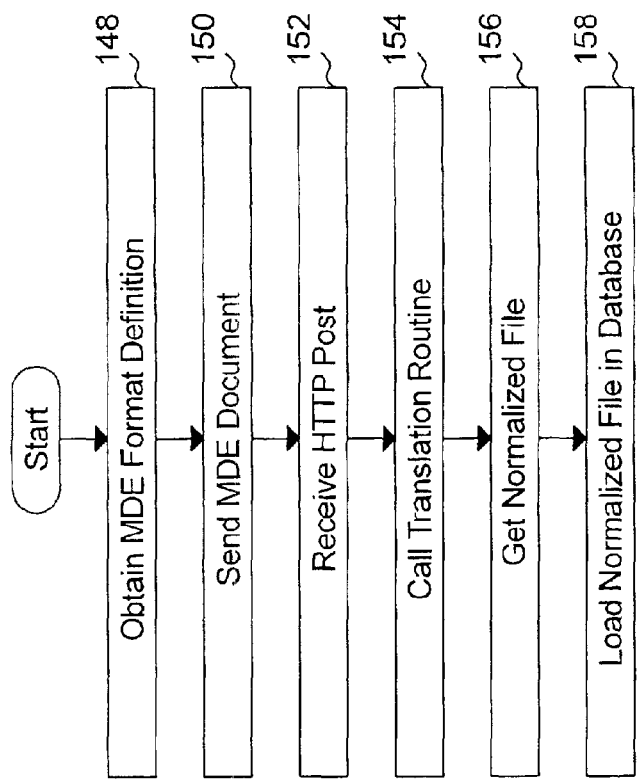
FIG. 7e is a flow chart representing an exemplary work flow script in accordance with one embodiment of the present invention.
Figure 7D:
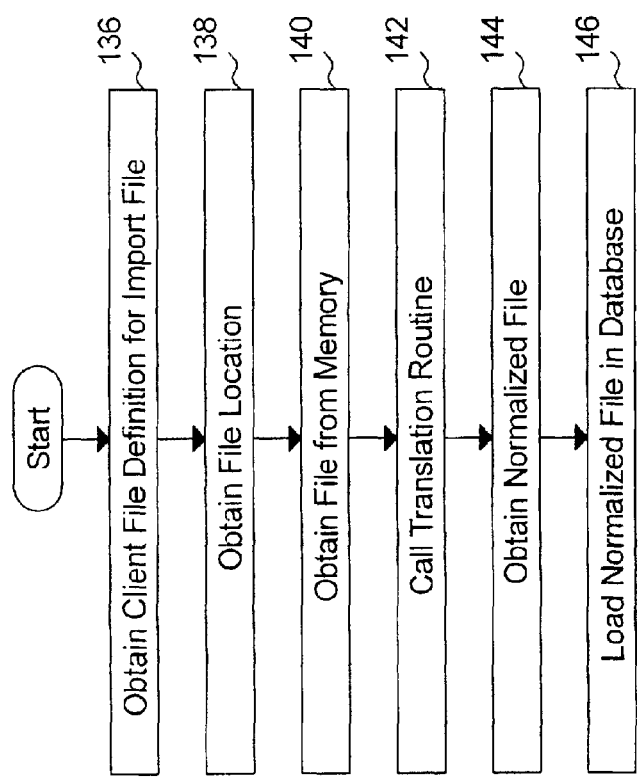
FIG. 7d is a flow chart representing an exemplary work flow script in accordance with one embodiment of the present invention.

The flowchart of FIG. 7d represents exemplary steps performed by the session management engine 46 in response to user selection of uploading a file (98 or 106 of FIG. 7a).

Step 136 represents obtaining the client transaction definition for the file to be imported either through operator selection of available definitions or by looking up a client transaction definition that is associated with the client 24 in an applicable database file. Step 138 represents obtaining the file location from the workstation 36 and step 140 represents providing the workstation 36 with applicable scripts to upload the file from the location through the secure session and write the file to a predetermined location.

Step 140 represents obtaining the file from the predetermined location and step 142 represents calling the translation routine of the translation engine 48. Step 144 represents obtaining the normalized transactions from the translation engine 48 and step 146 represents loading the transaction into the invoice and payment records 51 of the database 50.

The flowchart of FIG. 7e represents exemplary steps performed by the session management engine 46 to provide manual entry of invoice or payment data (100 and 108 of FIG. 7a).

Step 148 represents obtaining the client transaction definition for the file to be imported either through operator selection of available definitions or by looking up a client transaction definition that is associated with the client 24 in an applicable database file.

Step 150 represents sending a manual data entry document compliant with the client transaction definition to the workstation 36. Step 152 represents receiving a post of the manually entered transaction back from the workstation 36 over the secure session.

Step 154 represents calling the translation routine of the translation engine 48 and step 156 represents receiving the normalized transaction back from the translation engine 48. Step 158 represents loading the normalized transaction into the invoice and payment records 51 of the database 50.

Translation Engine

Figure 8B:
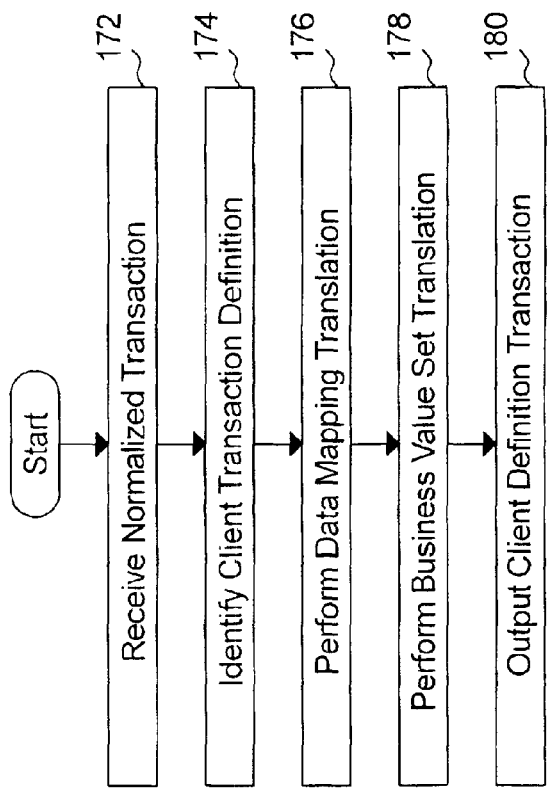
FIG. 8b is a flow chart representing an exemplary translation of an export transaction in accordance with one embodiment of the present invention.
Figure 8A:
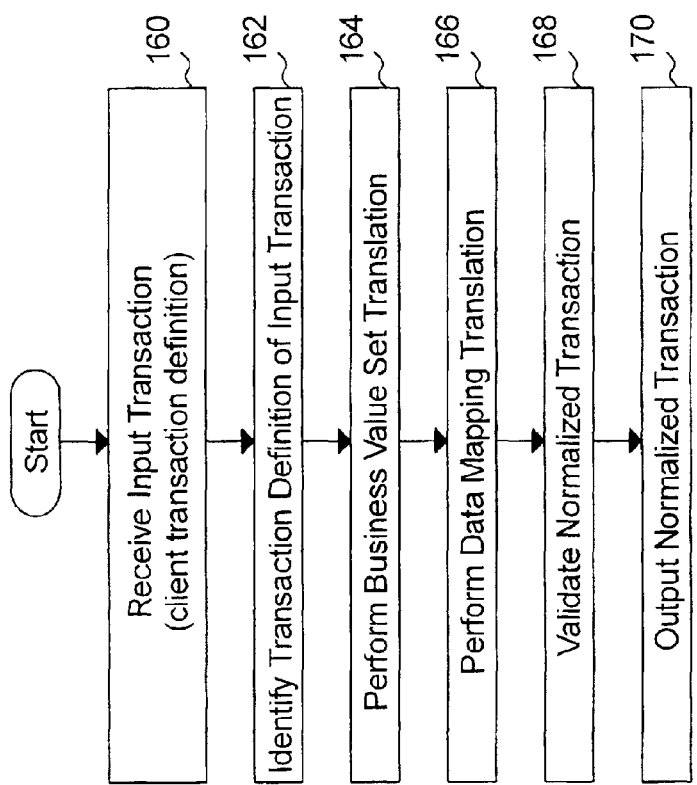
FIG. 8a is a flow chart representing exemplary translation processing of an import transaction in accordance with one embodiment of the present invention.

Turning to FIGS. 8a and 8b in conjunction with FIG. 2, exemplary operation of the translation engine 48 is shown. The translation engine 48 translates invoice transactions between a client transaction definition and value set compatible with a clients database system 26 (or a division's database system 38) and a normalized transaction definition and value set compatible with the invoice and payment records 51 in the database 50. Referring to FIG. 8a, operation of the translation engine 48 with respect to translating a transaction from a client definition transaction to a normalized transaction is shown.

Step 160 represents receipt of a transaction corresponding to the client transaction definition. Referring briefly to FIGS. 9a and 9b, portions of exemplary client transactions are represented. Exemplary transaction 182 is a comma delimitated transaction definition that includes a plurality of data elements 186a–186n each of which is separated from adjacent data elements 186a–186n by a comma symbol. Each data element 186a–186n is identified by its sequential location within the transaction (e.g. data element 186e which is the $5^{th}$ data element in the transaction represents invoice date) and includes data that corresponds with transaction format rules. For example, the transaction format rules that correspond to the invoice date may require that the date element 186e contain 6 digits in a MMDDYY format.

Exemplary transaction 184 is a tagged data element transaction definition that includes a plurality of data elements 190a–190n each of which is positioned following an element tag 192a–192n that identifies the contents of the following data element 190a–190n. Again, the data within each element complies with transaction format rules.

It should be appreciated that the exemplary transactions 182 and 184 each represent only a portion of a transaction. An actual transaction may consist of many more elements and the permutations of client transaction definitions may be large.

Step 162 represents identifying the particular client transaction definition with which the received transaction complies. In the exemplary embodiment, the session management engine 46 will provide a transaction definition type indicator to the translation engine when it calls the translation routine. The transaction definition type indicator will correspond to the type of transaction that the client system indicated. However, it is envisioned that the translation engine 48 may independently determine the client transaction definition type.

Step 164 represents performing business value set translation. Because each client database system 26 (and each division database system 38) may identify other clients, products, services, and other invoice information by different value sets, the value sets must be normalized. For example, a particular client 24 may be identified by a unique client number, client 007 for example, in the normalized transaction. However, the clients database system 26 requires a vendor number and the vendor number that corresponds to client 007 may be V319 for example. As such, the translation engine 48 relies on client specific business value translation tables 58 to map business values from client specific values 192 in the client transaction to normalized values 194.

Step 166 represents performing data mapping translation. Referring briefly to FIG. 10a, to perform data mapping translation, the translation engine relies on a data mapping table 196 for each of the possible client transaction definitions that are stored in the data mapping database 56. Each data mapping table 196 associates a client transaction field 198 and mapping rules 200 to each field 202 in the normalized transaction. The table 136 also indicates whether the field is required for purposes of validation discussed later herein. Because each field in a normalized transaction may include data that is only a portion of a filed from a client transaction (for example, a client transaction date field may include a month, day, and year organized as MMDDYYYY while the normalized transaction may include three separate fields identified as month, day, and year), the mapping rules 200 may indicate which portion of the client transaction field to map to the normalized transaction field. Because the normalized transaction field may be either longer or shorter than the client transaction filed, the mapping rules 200 may indication which characters to truncate or which characters to add as default characters.

After performing both business value translation and data mapping translation, the normalized data must be validated at step 168. The translation engine 48 validates the normalized transaction by assuring that each field identified as required in the mapping table 196 is included and that the data within each such required field matches field requirements.

Step 170 represents outputting the normalized transaction to the session management engine 46.

Turning to FIG. 8b, exemplary steps for translating a normalized transaction to a transaction compliant with a client transaction definition are shown. Step 172 represents receiving the normalized transaction and step 174 represents identifying the client transaction definition required. In the exemplary embodiment, the client transaction definition will be provided as a client transaction indicator by the session management engine 46.

Step 176 represents performing data mapping translation. Referring briefly to FIG. 10, to perform data mapping translation, the translation engine 48 relies on mapping tables 204 that are stored in the data mapping database 56. The mapping tables 204 associate each normalized data field 206 to a client transaction definition data field 208 (if required) and to mapping rules 210.

Because the client transaction definition data field 208 may require data from one or more normalized fields 206 (e.g. the date field example discussed earlier), the mapping rules may identify that the normalized field 206 is mapped to a specific sub portion of the client transaction definition field 208. Because the client transaction data field 208 may have more or fewer characters, the mapping rules may indicate which characters to truncate and/or default characters to add.

Step 178 represents performing business value translation. As discussed with respect to step 164, business value translation is performed utilizing business value translation tables 58.

Step 180 represents outputting the transaction that complies with the client transaction definition to the session management engine 46.

Although the invention has been shown and described with respect to certain preferred embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed is:

1. An automated invoice management system for operation with a plurality of client systems including a plurality of vendor client systems and at least one payer client system, the automated invoice management system comprising:

a network circuit for communicating invoice management data with the plurality of client systems;

a session management engine coupled to the network circuit for establishing a secure session with each client system, receiving a first vendor invoice transaction from a first vendor client system and providing an export invoice transaction to a payer client system;

the first vendor invoice transaction being compliant with a first vendor client transaction definition and including vendor recognized business values, including a vendor recognized payer ID code and a vendor recognized vendor ID code, and an amount due from a customer associated with the payer client system;

the export invoice transaction being compliant with a payer client transaction definition and including payer recognized business values, including a payer recognized payer ID code and a payer recognized vendor ID code, and the amount due from the customer; and a translation engine for:

performing data mapping translation to translate the first vendor invoice transaction from the vendor invoice transaction definition to a normalized invoice transaction definition and for performing business value translation to translate vendor recognized business values to normalized business values; and performing data mapping translation to translate the normalized invoice transaction from the normalized invoice transaction definition to the paver client transaction definition and performing business value translation to translate normalized business values to payer recognized business values.

2. The automated invoice management system of claim 1, wherein:

performing business value translation to translate vendor recognized business values to normalized business values comprises:

translating the vendor recognized vendor ID code to a global client code of the vendor by looking up the global client ID code of the vendor associated with the vendor recognized vendor ID code in a customer control table;

translating the vendor recognized payer ID code to a global client code of the payer by looking up the global client ID code of the payer associated with the vendor recognized payer ID code in a customer control table; and performing business value translation to translate normalized business values to payer recognized business values comprises:

translating the global client code of the vendor to a payer recognized ID code of the vendor by looking up the payer ID code of the vendor associated with the global client code of the vendor and the global client ID code of the payer in a vendor control table; and translating the global client ID code of the payer to a payer recognized ID code of the payer by looking up the payer ID code of the payer associated with the global client code of the payer in the vendor control table.

3. The automated invoice management system of claim 1, wherein:

performing business value translation to translate vendor recognized business values to normalized business values comprises:

translating the vendor recognized vendor ID code to a global client code of the vendor by mapping the vendor recognized vendor ID to the global client ID code which corresponds to the vendor recognized ID code in a look up table;

translating the vendor recognized paver ID code to a global client code of the payer by mapping vendor recognized payer ID code to the global client ID code of the payer which corresponds to the vendor recognized ID code in the look up table; and performing business value translation to translate normalized business values to payer recognized business values comprises:

translating the global client code of the vendor to a payer recognized ID code of the vendor by mapping the global client code of the vendor to the payer ID code of the vendor that corresponds to both the global client ID code of the payer and the global client ID code of the vendor in the look up table; and translating the global client ID code of the payer to a payer recognized ID code of the payer by mapping the global client code of the payer to the payer ID code of the payer that corresponds to the global client ID code of the payer in the look up table.

4. The automated invoice management system of claim 1:

wherein the session management engine further receives a payer remittance transaction from the payer client system, and providing a vendor remittance transaction to the vendor client system;

the payer remittance transaction being compliant with a payer remittance transaction definition and including payer recognized business values associated with the export invoice transaction including the payer recognized payer ID code and the payer recognized vendor ID code;

the vendor remittance transaction being complaint with a vendor remittance transaction definition and including vendor recognized business value associated with the export invoice transaction including the vendor recognized payer ID code and the vendor recognized vendor ID code; and wherein the translation engine further:

performing data mapping translation to translate the payer remittance transaction from the payer remittance transaction definition to a normalized remittance transaction definition and for performing business value translation to translate the payer recognized business values to normalized business values;

performing data mapping translation to translate the normalized remittance transaction from the normalized remittance transaction definition to the vendor remittance transaction definition and for performing business value translation to translate the normalized business values to vendor recognize business values.

5. The automated invoice management system of claim 1, wherein:

the session management engine further receives a second vendor invoice transaction from a second vendor client system, the second vendor invoice transaction being compliant with a second vendor client transaction definition and including vendor recognized business values, including a vendor recognized payer ID code and a vendor recognized vendor ID code, and amounts due form the payer client; and the translation engine further provides for:

performing data mapping translation to translate the second vendor invoice transaction form the vendor invoice transaction definition to a second normalized invoice transaction compliant with the normalized invoice transaction definition and performing business value translation to translate vendor recognized business values to normalized business values; and performing data mapping translation to translate the second normalized invoice transaction from the normalized invoice transaction definition to the payer client transaction definition and performing business value translation to translate normalized business values to the payer recognized business values.

6. A method of providing automated invoice management services to a plurality of client systems including a plurality of vendor client systems and at least one payer client system, the method comprising:

establishing a secure session with at least a first vendor client system and with at least one payer client system through a network circuit;

receiving a first vendor invoice transaction from the first vendor client system, the first vendor invoice transaction compliant with a first vendor client transaction definition and including vendor recognized business values, including a vendor recognized payer ID code and a vendor recognized vendor ID code, and an amount due from a customer associated with the payer client system;

translating the first vendor invoice transaction to a normalized invoice transaction by performing data mapping translation to translate the first vendor invoice transaction from the vendor invoice transaction definition to a normalized invoice transaction definition and for performing business value translation to translate vendor recognized business values to normalized business valued; and translating the normalized invoice transaction to an export invoice transactions by performing data mapping transaction to translate the normalized invoice transaction from the normalized invoice transaction definition to the payer client transaction definition and performing business value translation to translate normalized business values to payer recognized business values and providing the export invoice transaction to the payer client system.

7. The method of providing automated invoice management services of claim 9, wherein:
performing business value translation to translate vendor recognized business values to normalized business values comprises:
translating the vendor recognized vendor ID code to a global client code of the vendor by looking up the global client ID code of the vendor associated with the vendor recognized vendor ID code in a customer control table;
translating the vendor recognized payer ID code to a global client code of the payer by looking up the global client ID code of the payer associated with the vendor recognized payer ID code in a customer control table; and
performing business value translation to translate normalized business values to payer recognized business values comprises:
translating the global client code of the vendor to a payer recognized ID code of the vendor by looking up the payer ID code of the vendor associated with the global client code of the vendor and the global client ID code of the payer in a vendor control table; and
translating the global client ID code of the payer to a payer recognized ID code of the payer by looking up the payer ID code of the payer associated with the global client code of the payer in the vendor control table.

8. The method of providing automated invoice management services of claim 6, wherein:
performing business value translation to translate vendor recognized business values to normalized business values comprises:
translating the vendor recognized vendor ID code to a global client code of the vendor by mapping the vendor recognized vendor ID to the global client ID code which corresponds to the vendor recognized ID code in a look up table;
translating the vendor recognized payer ID code to a global client code of the payer by mapping vendor recognized payer ID code to the global client ID code of the payer which corresponds to the vendor recognized ID code in the look up table; and
performing business value translation to translate normalized business values to payer recognized business values comprises:
translating the global client code of the vendor to a payer recognized ID code of the vendor by mapping the global client code of the vendor to the payer ID code of the vendor that corresponds to both the global client ID code of the payer and the global client ID code of the vendor in the look up table; and
translating the global client ID code of the payer to a payer recognized ID code of the payer by mapping the global client code of the payer to the payer ID code of the payer that corresponds to the global client ID code of the payer in the look up table.

9. The method of providing automated invoice management service of claim 6, further comprising:
receiving a second vendor invoice transaction from a second vendor client system, the second vendor invoice transaction being compliant with a second vendor client transaction definition and including vendor recognized business values, including a vendor recognized payer ID code and a vendor recognized vendor ID code, and amounts due from the payer client;
performing data mapping translation to translate the second vendor invoice transaction from the vendor invoice transaction definition to a second normalized invoice transaction compliant with the normalized invoice transaction definition and performing business value translation to translate vendor recognized business values to normalized business values; and
performing data mapping translation to translate the second normalized invoice transaction from the normalized invoice transaction definition to an export invoice transaction complying with the payer client transaction definition and performing business value translation to translate normalized business values to payer recognized business values; and
providing both the export invoice transaction and the second export invoice transaction to the payer client in a single file through the network circuit.

10. An automated invoice management system for operation with a plurality of client systems including a plurality of vendor client systems and at least one payer client system, the automated invoice management system comprising:
a network circuit for communicating invoice management data with the plurality of client systems;
a translation database comprising at least one look up table associating normalized business values with each of vendor recognized business values and payer recognized business values;
a session management engine coupled to the network circuit and the translation database for establishing a secure session with each client system, receiving a first vendor invoice transaction from a first vendor client system and providing an export invoice transaction to a payer client system;
the first vendor invoice transaction being complicate with a first vendor client transaction definition and including vendor recognized business values, including a vendor recognized payer ID code and a vendor recognized vendor ID code, and an amount due from a customer associated with the payer client system;
the export invoice transaction being complaint with a payer client transaction definition and including payer recognized business values, including a payer recognized payer ID code and a payer recognized vendor ID code, and the amount due from the customer; and
a translation engine for:
performing data mapping translation to translate the first vendor invoice transaction from the vendor invoice transaction definition to a normalized invoice transaction definition and for performing business value translation to translate vendor recognized business values to normalized business values by looking up the normalized business value that corresponds to each vendor recognized business value in the look up table; and
performing data mapping translation to translate the normalized invoice transaction from the normalized invoice transaction definition to the payer client transaction definition and performing business value translation to translate normalized business values to payer recognized business values by looking up the payer recognized business value that corresponds to each normalized business value in the look up table.

11. The automated invoice management system of claim 10, wherein:

performing business value translation to translate vendor recognized business values to normalized business values comprises:

translating the vendor recognized vendor ID code to a global client code of the vendor by mapping the vendor recognized vendor ID to the global client ID code which corresponds to the vendor recognized ID code in a look up table;

translating the vendor recognized payer ID code to a global client code of the payer by mapping vendor recognized payer ID code to the global client ID code of the payer which corresponds to the vendor recognized ID code in the look up table; and performing business value translation to translate normalized business values to payer recognized business values comprises:

translating the global client code of the vendor to a payer recognized ID code of the vendor by mapping the global client code of the vendor to the payer ID code of the vendor that corresponds to both the global client ID code of the payer and the global client ID code of the vendor in the look up table; and translating the global client ID code of the payer to a payer recognized ID code of the payer by mapping the global client code of the payer to the payer ID code of the payer that corresponds to the global client ID code of the payer in the look up table.

12. The automated invoice management system of claim 10, wherein the at least one look up table comprises:

a vendor control table comprising a plurality of records, each record associating a payer recognized vendor ID code with a normalized vendor ID code of one of the plurality of vendor client systems and a normalized ID code of the payer client system; and a customer control table comprising a plurality of records, each record associating a vendor recognized payer ID code with the normalized ID code of payer client system and a normalized ID code of one of the plurality of vendor client systems.

13. The automated invoice management system of claim 12, wherein:

performing business value translation to translate vendor recognized business values to normalized business values comprises:

translating the vendor recognized vendor ID code to a global client code of the vendor by looking up the global client ID code of the vendor associated with the vendor recognized vendor ID code in a customer control table;

translating the vendor recognized payer ID code to a global client code of the payer by looking up the global client ID code of the payer associated with the vendor recognized payer ID code in a customer control table; and performing business value translation to translate normalized business values to payer recognized business values comprises:

translating the global client code of the vendor to a payer recognized ID code of the vendor by looking up the payer ID code of the vendor associated with the global client code of the vendor and the global client ID code of the payer in a vendor control table; and translating the global client ID code of the payer to a payer recognized ID code of the payer by looking up the payer ID code of the payer associated with the global client code of the payer in the vendor control table.

* * * * *